United States Patent
Yahashi et al.

[11] Patent Number: 5,760,884
[45] Date of Patent: Jun. 2, 1998

[54] DISTANCE MEASURING APPARATUS CAPABLE OF MEASURING A DISTANCE DEPENDING ON MOVING STATUS OF A MOVING OBJECT

[75] Inventors: Akira Yahashi, Kobe; Takuto Joko, Nagaokakyo, both of Japan

[73] Assignee: Minolta Co., Ltd., Osaka, Japan

[21] Appl. No.: 329,181

[22] Filed: Oct. 26, 1994

[30] Foreign Application Priority Data

Oct. 27, 1993 [JP] Japan ............... 5-269226

[51] Int. Cl.⁶ .................. G01C 3/00; B60T 7/16
[52] U.S. Cl. .................. 356/3.14; 180/167; 356/3.16; 356/3.05; 901/47
[58] Field of Search ............... 901/47; 356/3.14, 356/3.16, 3.02, 3.05; 180/167, 169

[56] References Cited

U.S. PATENT DOCUMENTS

| | | | |
|---|---|---|---|
| 4,632,543 | 12/1986 | Endo | 180/167 |
| 4,963,911 | 10/1990 | Matsui et al. | |
| 5,026,153 | 6/1991 | Suzuki et al. | 180/167 |
| 5,229,941 | 7/1993 | Hattori | 180/167 |
| 5,234,071 | 8/1993 | Kajiwara | 180/169 |
| 5,367,457 | 11/1994 | Ishida | 180/169 |
| 5,374,985 | 12/1994 | Beadles et al. | |
| 5,461,357 | 10/1995 | Yoshioka et al. | 180/167 |

FOREIGN PATENT DOCUMENTS

| | | | |
|---|---|---|---|
| 53-138367 | 2/1978 | Japan | 356/3.05 |
| 2-287180 | 11/1990 | Japan. | |
| 3-14477 | 2/1991 | Japan. | |
| 4-12805 | 3/1992 | Japan. | |

*Primary Examiner*—Stephen C. Buczinski
*Attorney, Agent, or Firm*—Burns, Doane, Swecker & Mathis, LLP

[57] ABSTRACT

A distance measuring apparatus of an apparatus having a moving mechanism includes: a speed detector; and a mechanism responsive to a moving speed signal supplied from the speed detector which varies a focus lens position and a focal length of a light receiving optical system, a scanning range of a light projecting optical system, a base length, a position where light axes of a pair of light receiving optical systems or light axes of the light receiving and light projecting optical systems cross with each other, or responsive to a moving direction signal supplied from a moving direction detecting means of the apparatus having the moving mechanism which changes a measurement direction of a field of view. Thus, optimal measurement accuracy and a field of view to be measured can always be provided even though the moving speed or the moving direction of the apparatus having the moving mechanism is varied.

42 Claims, 9 Drawing Sheets

DISTANCE MEASURING APPARATUS CAPABLE OF MEASURING A DISTANCE DEPENDING ON MOVING STATUS OF A MOVING OBJECT

BACKGROUND OF THE INVENTION

1. Field of the Invention

The present invention relates to distance measuring apparatuses, and more particularly, it is concerned with a distance measuring apparatus mounted on a moving object such as an automobile and a self-controlled moving robot for determining a distance to an object to be measured.

2. Description of the Related Art

An apparatus of interest for the present invention, which measures a distance between two automobiles moving in the same direction is disclosed in Japanese Patent Publication No. 4-12805.

In such a conventional apparatus for measuring the distance, measurement accuracy and a field of view to be measured become constant because a focal length, a base length, a position where optical axes cross, and a measurement direction of a field of view of a pair of light receiving optical systems or light receiving and light projecting optical systems remain fixed. As a result, such a conventional apparatus cannot provide an optimal measurement accuracy or a field of view to be measured depending on variation of a moving speed of a moving object. Another disadvantage of the conventional apparatus is that an actual moving direction of a moving object and a measurement direction of a field of view do not match if the moving object changes its moving direction by steering and the like.

SUMMARY OF THE INVENTION

Therefore, one object of the present invention is to provide a distance measuring apparatus capable of measuring a distance depending on a moving status of a moving object.

Another object of the present invention is to provide a moving object having the above-described distance measuring apparatus.

The above objects of the present invention are achieved by the distance measuring apparatus including the following elements. More particularly, the distance measuring apparatus of the present invention includes a speed detector which detects a moving speed of an object, and a controller which varies a field of view to be measured and measurement accuracy of the distance measuring apparatus depending on a moving speed of the moving object detected by the speed detector.

Since the distance measuring apparatus includes the above elements, the field of view to be measured and the measurement accuracy of the distance measuring apparatus are varied depending on the moving speed of the moving object, thereby allowing measurement depending on the moving status of the moving object.

In another aspect of the present invention, a distance measuring apparatus includes a moving direction detector which detects a moving direction of a moving object, and a controller which varies a measurement direction of a field of view of the distance measuring apparatus depending on the moving direction of the moving object.

Since the distance measuring apparatus includes the above elements, the measurement direction of the field of view of the distance measuring apparatus is varied depending on the moving direction of the moving object, thereby allowing fine measurement depending on the moving status of the moving object.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
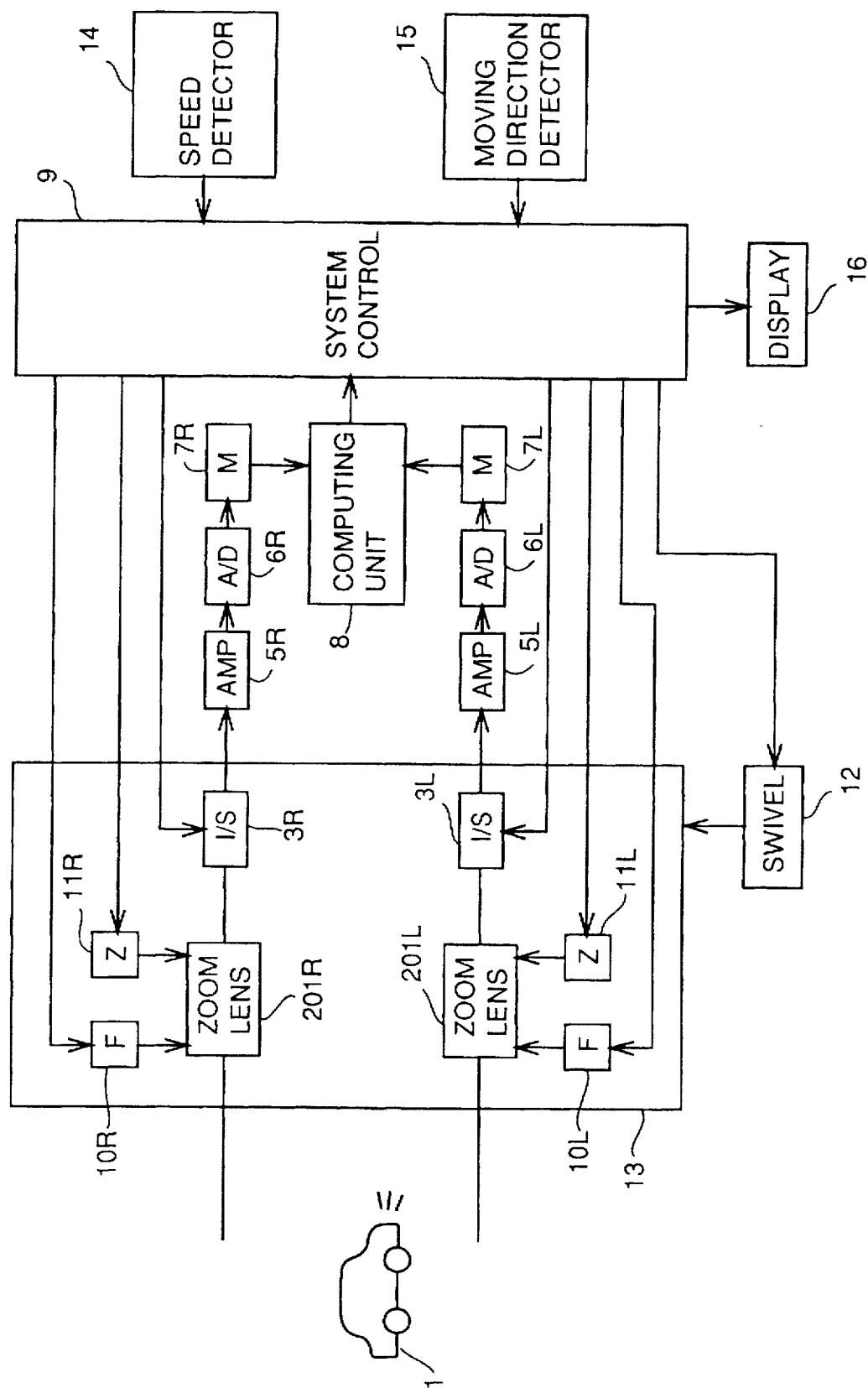
FIG. 1 is a structural view of a distance measuring apparatus showing a first embodiment of the present invention.

Embodiments of the present invention will be described below with reference to the drawings. Please note that the same reference numerals are given to the same or the corresponding portions in the description of principles of the distance measurement and in respective embodiments.

First, the principles of this type of distance measuring apparatus will be described.

Figure 6:
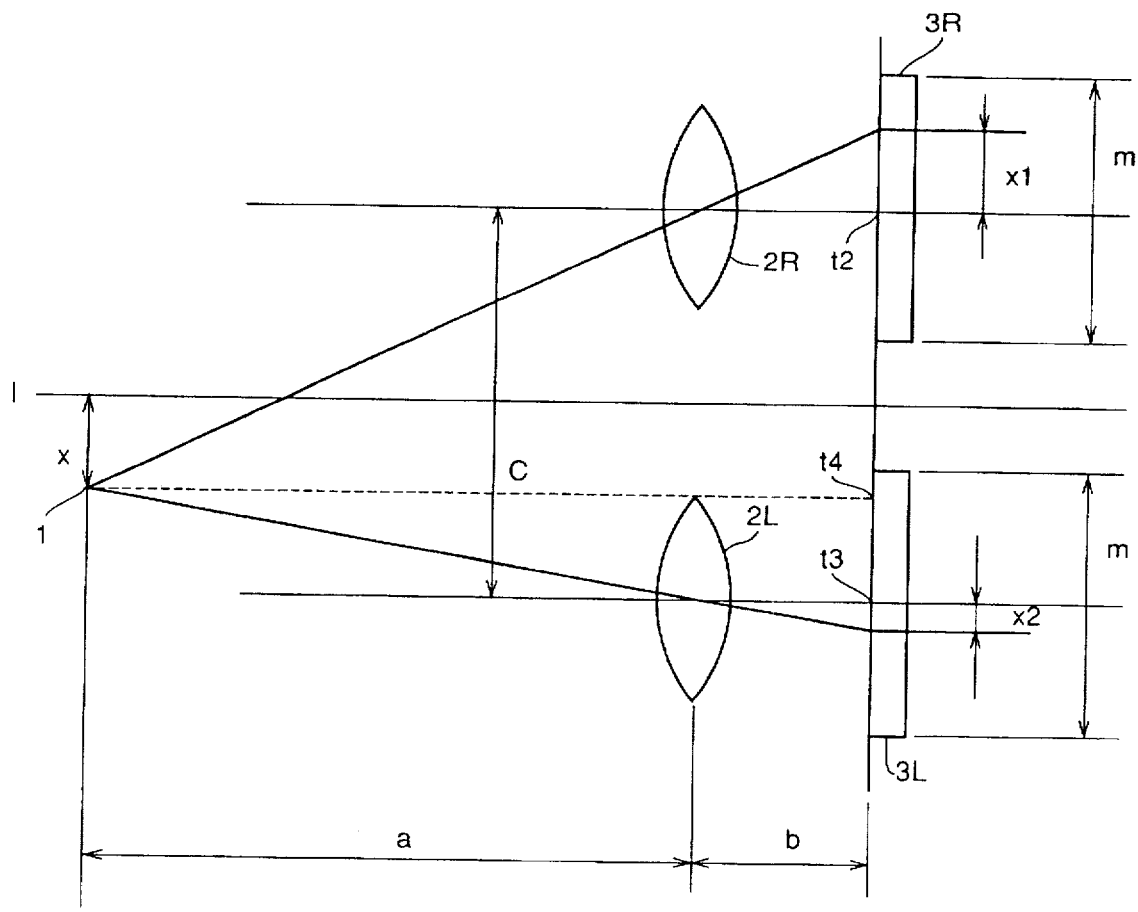
FIG. 6 is a measurement principle view of a passive type distance measuring apparatus.

FIG. 6 is a principle view of a passive type distance measuring apparatus. In FIG. 6, an image of an object to be measured 1 is formed on image sensors 3R and 3L by means of light receiving optical systems 2R and 2L. Assume that a position of object to be measured 1 is spaced from light receiving systems 2R and 2L by a distance "a" and is spaced from a straight line l (which is parallel to optical axes of light receiving systems 2R and 2L, and is equally spaced from respective optical axes) by a distance X, then images on image sensors 3R and 3L are deviated by $x_1$ and $x_2$, respectively, from positions of images when object to be measured 1 is placed at infinity on straight line l. Assuming a base length is "c", a distance from a pair of lenses 2R and 2L to image sensors 3R and 3L is "b", then distance a from lenses 2R and 2L to object to be measured 1 is given by an equation (1A-2) by use of an expression (1A-1) which represents similarity between a triangle formed by object to be measured 1 and lenses 2R and 2L and a triangle formed by object to be measured 1 and image sensors 3R and 3L.

$$a:c = (a+b):(c+x_1+x_2) \tag{1A-1}$$

$$a = c \times b/(x_1 + x_2) \tag{1A-2}$$

Also, assuming a focal length of the pair of lenses 2R and 2L is "f", resulting relationship is $$1/f = 1/a + 1/b \tag{1A-3}$$

If "b" is eliminated from equations (1A-2) and (1A-3), then an equation (1A-4) is obtained $$a = c \times f/(x_1 + x_2) + f \tag{1A-4}$$

Thus, by determining the above deviation $(x_1 x_2)$, distance "a" from lenses 2R and 2L to object be measured 1 can be calculated.

Figure 7:
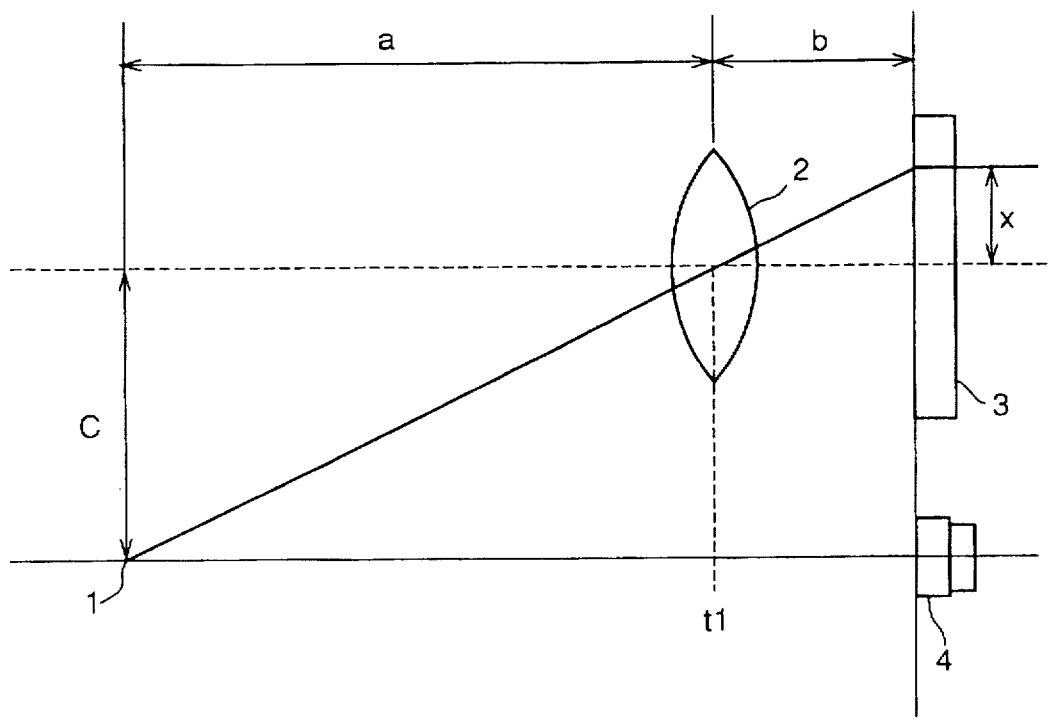
FIG. 7 is a measurement principle view of an active type distance measuring apparatus.

FIG. 7 is a principal view of an active type distance measuring apparatus. In FIG. 7, an image of an object to be measured 1 which is illuminated by light beams projected from a light projecting optical system including a light source 4 is formed on an image sensor 3 by means of a light receiving optical system 2, wherein a position of the image on image sensor 3 is deviated by x from a position when object to be measured 1 is placed at infinity. Assuming a base length is "c" and a distance from light receiving optical system 2 to image sensor 3 is "b", a distance "a" from light receiving optical system 2 to object to be measured 1 is given by an equation (1B-2) by use of an expression (1B-1) which represents similarity between a triangle formed by object to be measured 1, lens 2, and a point t, and a triangle formed by object to be measured 1, the image on image sensor 3 and light source 4.

$$a:c = (a+b):(c+x) \tag{1B-1}$$

$$a = c \times b/x \tag{1B-2}$$

Also, assuming a focal length of light receiving optical system 2 is "f", then a relationship represented by the above equation (1A-3) is given. If "b" is eliminated from equations (1B-2) and (1A-3), then an equation (1B-4) is given.

$$a = (x+c) \times f/x \tag{1B-4}$$

Thus, by determining the above deviation x, distance "a" from light receiving optical system 2 to object to be measured 1 can be calculated.

In the meanwhile, in the case of the passive type distance measuring apparatus (see FIG. 6), if a pixel pitch and accuracy of calculation of the image sensor are constant, it is necessary to increase $(x_1+x_2)$ in order to improve the measurement accuracy. This $(x_1+x_2)$ is represented by an equation (2A) which is a variation of the equation (1A-4)

$$x_1 + x_2 = c \times f/(a-f) \tag{2A}$$

More particularly, in order to increase $(x_1+x_2)$, either increasing focal length "f", increasing base length c, or limiting the measurement range to a close range (i.e., limiting distance a from lenses 2R and 2L to object to be measured 1 to a small range) is required.

In the meanwhile, measurement is allowed when the deviation $x_1$, $x_2$ of the images on image sensors 3R and 3L is not more than half a width "m" of the image sensor in the direction of the base line, thus satisfying $$x_1 < m/2 \tag{3A-1}$$

$$x_2 < m/2 \tag{3A-2}$$

Assume a position of the object in the direction of the base line is X, then $x_1$ and $x_2$ are represented by equations (4A-2) and (5A-2) by use of equations (4A-1) and (5A-1) as follows:

$$x_1:b = (x_1 c/2 + X):(a+b) \tag{4A-1}$$

$$x_1 = b(c/2 + X)/a \tag{4A-2}$$

$$x_2:b = (x_2 + c/2 - X) : (a+b) \tag{5A-1}$$

$$x_2 = b(c/2 - X)/a \tag{5A-2}$$

where equation (4A-1) represents similarity between a triangle formed by lens 2R, the image on image sensor 3R and a point $t_2$ and a triangle formed by object to be measured 1, the image on image sensor 3R and a point $t_4$, and equation (5A-1) represents similarity between a triangle formed by lens 2L, the image on image sensor 3L, and a point $t_3$ and a triangle formed by object to be measured 1, the image on image sensor 3L, and a point $t_4$.

Since the above equation (1A-3) is also satisfied here, eliminating "b" from equations (4A-2) and (1A-3) as well as equations (5A-2) and (1A-3), it follows $$x_1 = f(c/2 + X)/(a-f) \tag{4A-3}$$

$$x_2 = f(c/2 - X)/(a-f) \tag{5A-3}$$

By use of equations (3A-1) and (4A-3), and equations (3A-2) and (5A-3), equations (6A) and (7A) are given as follows:

$$x_1 = f(c/2 + X)/(a-f) < m/2 \tag{6A}$$

$$x_2 = f(c/2 - X)/(a-f) < m/2 \tag{7A}$$

It can be seen from these relationships that it is easy to secure the field of view to be measured by increasing size "m" of the image sensor. On the other hand, in order to secure the field of view to be measured with size "m" of the image sensor being fixed, it is necessary to shorten focal length "f", to shorten base length "c", or to limit the measurement range to a long range (i.e., to limit distance a from lenses 2R and 2L to object to be measured 1 to a large range).

More particularly, it is desirable to adjust focal length "f" and base length "c" of the pair of light receiving optical systems depending on whether the measurement accuracy or the field of view to be measured has priority.

Further, the priority between the measurement accuracy and the field of view to be measured can be varied by adjusting the position where the pair of light receiving optical systems cross with each other.

Also, it is desirable to adjust the measurement direction of the field of view to be measured to the direction of the object to be measured.

In the case of the active type distance measuring apparatus (see FIG. 7), equations (2A), (6A), and (7A) applied to the passive type apparatus are combined to give a relationship $$x = c \times f/(a-f) < m/2 \tag{2B}$$

It can be seen from this relationship that it is easier to secure the field of view to be measured by increasing size "m" of the image sensor. On the other hand, in order to secure the field of view to be measured with size "m" of the image sensor being fixed, it is necessary to shorten focal length "f", to shorten base length "c", or to limit the measurement range to a long range (i.e., to limit distance a from lens 2 to object to be measured 1 to a large range).

More particularly, it is desirable to adjust focal length "f" and base length "c" of the light receiving optical system depending on whether the measurement accuracy or the field of view to be measured has priority.

Further, it is desirable to adjust the scanning range of the light projecting optical system (not shown in FIG. 7), the position where the optical axes of the light projecting and light receiving optical systems cross with each other, and the measurement direction of the field of view to be measured.

FIG. 1 is a structural view of a passive type distance measuring apparatus according to a first embodiment of the present invention.

In this embodiment, the distance measuring apparatus Is mounted on an automobile as an apparatus for measuring the distance between two automobiles moving in the same direction.

An object to be measured 1 is an automobile moving in front. The light receiving optical system comprises a pair of left and right zoom lenses 201R and 201L.

A main part of optics 13 comprises the light receiving optical system, focusing mechanisms 10R and 10L for controlling zoom lenses 201R and 201L, and zooming mechanisms 11R and 11L.

An operation/control portion includes: two-dimensional image sensors 3R and 3L on which images are formed by light directed from zoom lenses 201R and 201L; amplifiers 5R and 5L for amplifying outputs from image sensors 3R and 3L; A/D converters 6R and 6L; memories 7R and 7L; a computing unit 8; a system control 9; a speed detector 14 (which is implemented, for example, by a speed meter utilized in an ordinary automobile); a moving direction detector 15 (which will be described later in detail); a swiveling mechanism 12 (which will be described later in detail); and a display 16.

Now, an operation of the apparatus for measuring the distance between two automobiles moving in the same direction structured as above will be described. An image of object to be measured 1 is formed on image sensors 3R and 3L by means of the pair of left and right zoom lenses 201R and 201L. At this time, positions of the images on image sensors 3R and 3L are deviated from the positions obtained when object to be measured 1 is placed at infinity. Tone of the images formed on image sensors 3R and 3L are transformed into electric signals in image sensors 3R and 3L.

These electric signals are read sequentially for every pixel as video signals, and the resultant signals are amplified by amplifiers 5R and 5L. Then, the amplified video signals are sampled at a predetermined period by A/D converters 6R and 6L to be converted into digital signals. After that, these digital signals are stored in the pair of left and right memories 7R and 7L, respectively. Storing the signals to memories 7R and 7L is carried out for one scanning range, whereby once the storage for this one scanning range is carried out, the contents of memories 7R and 7L are reserved until the calculation of the distance is completed. These pair of left and right video signals which are digitalized, stored, and reserved are then processed by computing unit 8 for calculating the distance to object to be measured 1.

As to the processing in computing unit 8, either one of the left and right images is fixed so that the other is successively shifted, whereby comparison between the left and right images is carried out for every shift. As a result of the comparison, the distance can be determined based on the shift amount of the image when the left and right images optimally match with each other. More particularly, such a shift amount of the image corresponds to the deviation of the images on image sensors 3R and 3L, such that the distance can be determined based on the deviation of the image by use of equation (1A-4) provided for determining the distance.

One method to detect movement by moving direction detector 15 is, for example, to detect a white line on a road.

This method allows detection of the moving direction of the automobile by inputting an image of a road in front by a TV camera, and by detecting to which direction the white line on the road curves by edge detection by means of moving image processing.

Other methods may utilize detection of a steering angle of a handle of the automobile, detection of a line of sight of a driver, and the like for moving direction detector 15.

Swiveling mechanism 12 is implemented by a rotating support frame, and an actuator, a horizontal rotating stage and the like.

Figure 10A:
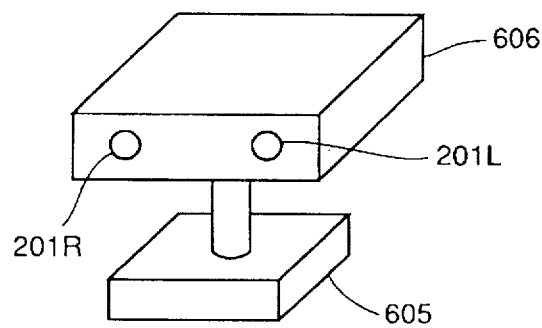
FIGS. 10A and 10B are views for use in illustrating a swiveling mechanism.
Figure 10B:
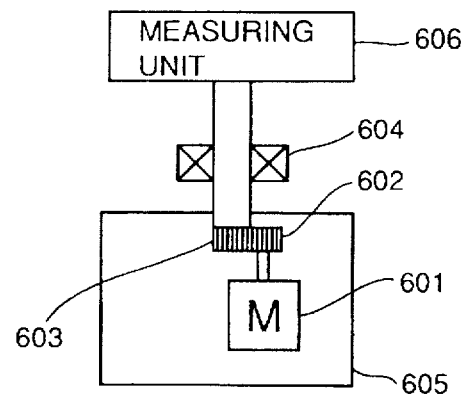

One example of swiveling mechanism 12 will be described below by use of FIGS. 10A and 10B. FIG. 10A is an outer view of the swiveling mechanism and FIG. 10B is a schematic illustration of the mechanism. With reference to FIGS. 10A and 10B, swiveling mechanism 12 includes a measuring unit 606, a support 605 for supporting measuring unit 606, a bearing 604, a motor 601 provided in support 605, a gear on the support side 602 which rotates by motor 601, and a gear on the measuring unit side 603 which is provided in measuring unit 606 and rotates in mesh with gear on the support side 602.

Motor 601 is rotated according to the moving direction of the automobile detected by moving direction detector 15, and measuring unit 606 is rotated in the direction of measurement by gears 602 and 603.

The moving speed of the apparatus itself detected by speed detector 14 is conveyed to system control 9, so that zoom lenses 201R and 201L are equally driven depending on the conveyed speed by means of focusing mechanisms 10R and 10L and zooming mechanisms 11R and 11L.

If the moving speed of the apparatus itself detected by speed detector 14 is low, zoom lenses 201R and 201L are equally driven to a short focal length side (hereinafter referred to as the wide side) so as to shorten the focal length, thus securing a wide field of view to be measured.

On the contrary, if the moving speed of the apparatus itself is high, then zoom lenses 201R and 201L are equally driven to a long focal length side (hereinafter referred to as the tele side) so as to increase the focal length, thus improving the measurement accuracy.

Now, examples of specific figures of the focal length, the position of the focus lens, the measurement accuracy, and the field of view to be measured in the distance measuring apparatus with respect to the moving speed of the apparatus itself according to the first embodiment will be described below.

Here, a method for calculating the measurement accuracy (i.e., a maximum measurement error) and the field of view to be measured (i.e., a horizontal field of view to be measured at a position spaced from the lens by a prescribed distance, and a shortest measurement distance from the lens) will be described.

First, as to the measurement accuracy, a variation of distance $x_0$ (which is equal to deviation $(x_1+x_2)$ described above) of the images on the image sensors in the case of a distance from the lens to the object to be measured being "a", and a variation of distance $x_0'$ of the images on the image sensors in the case of a distance from the lens to the object to be measured being $a+\Delta a$ are respectively expressed by equations (8A-1) and (8A-2) as follows:

$$x_0 = c \times f/(a-f) \tag{8A-1}$$

$$x_0' = c \times f/(a+\Delta a-f) \tag{8A-2}$$

Resolution of distance measurement (i.e., the maximum measurement error) is represented by $\Delta a$, given $(x_0-x_0')$ being a detection limit A of data in the image sensor.

Such a Δa can be expressed by an equation (8A-4) which is a variation of an equation (8A-3) as follows:

$$x_0 - x_0' = c \times f/(a-f) - c \times f/(a \cdot \Delta a - f) = A \qquad (8A\text{-}3)$$

$$\Delta a = (a-f)^2 / \{c \times f/A - (a-f)\} \qquad (8A\text{-}4)$$

Next, the field of view to be measured will be described with reference to FIG. 8. In the figure, it is assumed that a horizontal field of view to be measured of respective lenses 102R and 102L at positions spaced by a from lenses 102R and 102L is M, a horizontal field of view in the range where the horizontal field of view of lens 102R overlaps the horizontal field of view of lens 102L is L- Also, it is assumed that a distance from lenses 102R and 102L to a position where the fields of view of respective lenses are overlapped is "a'", a base line is "c", a width of image sensors 103R and 103L is "m", a distance from lenses 102R and 102L to image sensors 103R and 103L is "b", and a focal length is "f".

Equations (9A-1) and (9A-2) are satisfied as follows, wherein equation (9A-1) represents similarity between a triangle formed by horizontal field of view to be measured M and lens 102R (or 102L) and a triangle formed by image sensor 103R and lens 102R (or image sensor 103L and lens 102L), and equation (9A-2) represents similarity between a triangle formed by lenses 102R and 102L and a point $t_s$ and a triangle formed by image sensor 103R and lens 102R (or image sensor 103L and lens 102L).

$$M : a = m : b \qquad (9A\text{-}1)$$

$$c : a' = m : b \qquad (9A\text{-}2)$$

Figure 8:
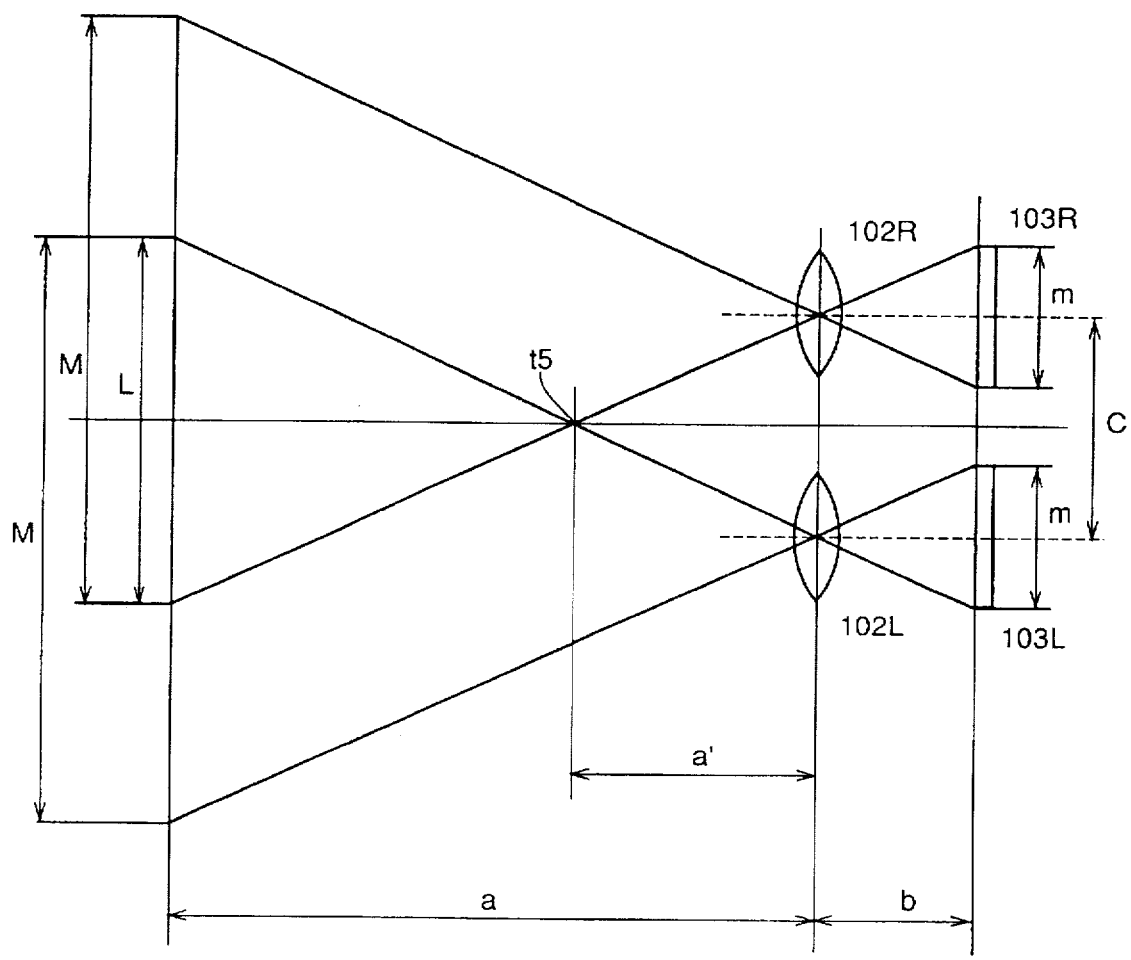
FIG. 8 is a view for use in explaining a method of calculating a field of view to be measured.

Also, as can be seen from FIG. 8, an equation (9A-3) can be satisfied.

$$L = M - c \qquad (9A\text{-}3)$$

Further, equation (1A-3) is also satisfied, so that by eliminating "b" from these equations, an equation (9A-4) is satisfied $$L = m \times (a-f)/f - c \qquad (9A\text{-}4)$$

If the distance from lenses 102R and 102L is a', then L=0. Substituting this for equation (9A-4), it follows $$a' = c \times f/m + f \qquad (9A\text{-}5)$$

More specifically, when the distance from lenses 102R and 102L is "a", the field of view having a length L is obtained in a horizontal direction, as expressed by equation (9A-4). At the same time, the shortest measurement distance from lenses 102R and 102L is a', as expressed by equation (9A-5).

Examples of specific figures of the base length, the measurement accuracy, and the field of view to be measured related to the moving speed of the apparatus itself are shown in a Table 1 below.

TABLE 1

| | | | | | |
|---|---|---|---|---|---|
| Moving speed of apparatus itself | 100 km/h | | 40 km/h | | |
| Focal length | 60 mm | | 15 mm | | |
| Distance to object to be measured | 100 m | 60 m | 60 m | 15 m | 3 m |
| Maximum measurement error | ±1.7 m | ±0.6 m | ±2.5 m | ±0.15 m | ±6.0 mm |
| Horizontal field of view to be measured at a position of object to be measured: | 10.6 m | 6.3 m | 25.5 m | 6.3 m | 1.2 m |
| Minimum measurement distance | 1.0 m | | 0.25 m | | |
| Base length | 100 mm | | | | |
| Width of image sensor | 6.4 mm (½ inch CCD) | | | | |
| Data detection limit of image sensor | ±1 μm (pixel pitch of 10 μm, positional detection accuracy is ± ¹/₁₀ of pixel pitch) | | | | |

In such a structure, since the focal length can be varied by driving zoom lenses, the priority between the accuracy and the field of view during measurement can be varied successively depending on the moving speed of the apparatuses itself.

Also, the moving direction of the apparatuses detected by moving direction detector 15 is conveyed to system control 9, so that depending on the conveyed direction, the direction of main part of optics 13 is changed to the moving direction of the apparatus itself by means of swiveling mechanism 12, thereby achieving a proper measuring direction of the field of view.

Figure 2:
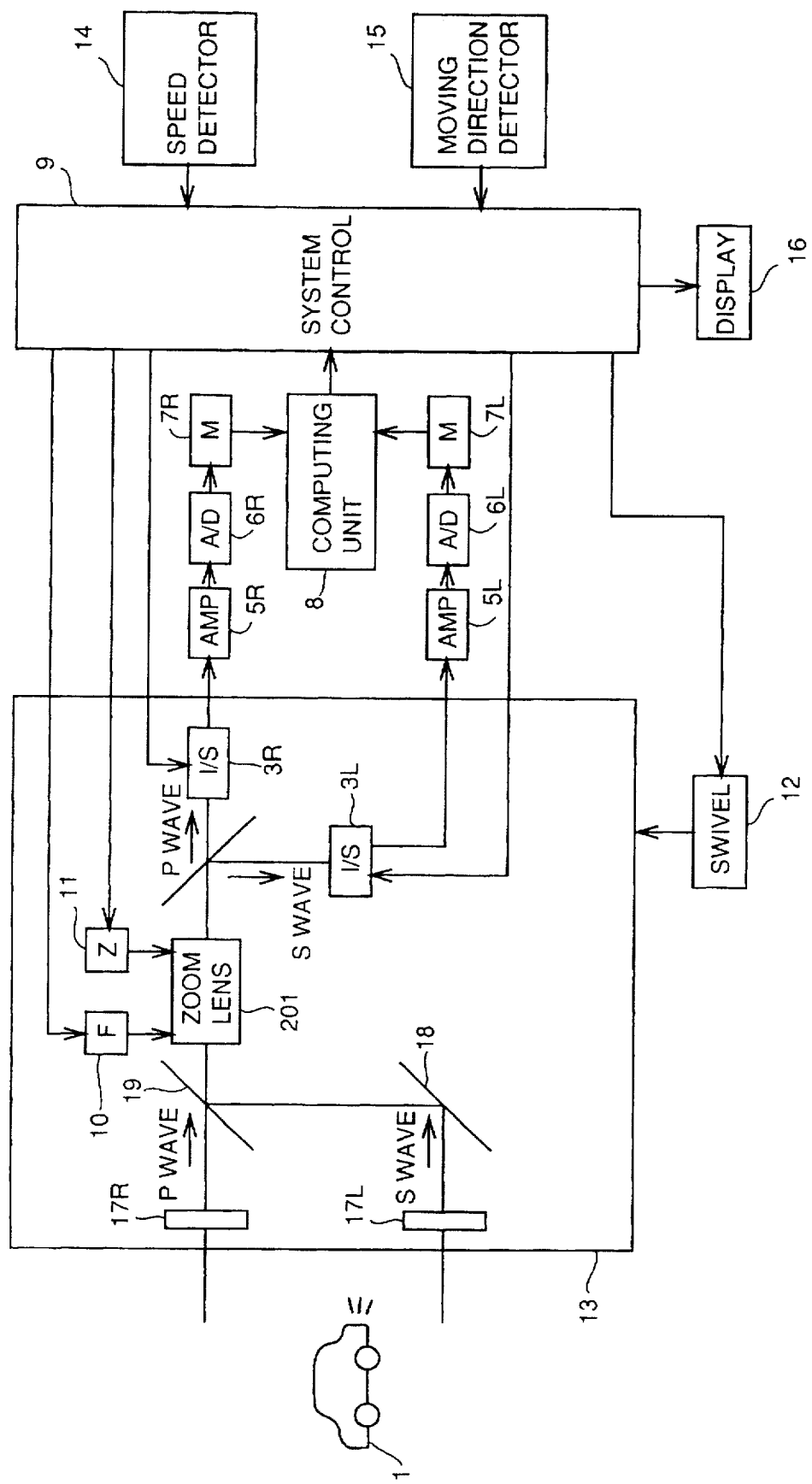
FIG. 2 is a structural view of a distance measuring apparatus showing a second embodiment of the present invention.

FIG. 2 is a structural view showing a passive type distance measuring apparatus according to a second embodiment of the present invention. The distance measuring apparatus of the second embodiment is obtained by modifying the distance measuring apparatus of the first embodiment, wherein the number of zoom lenses required is one instead of two.

A light receiving optical system includes a pair of left and right polarizers 17R and 17L (wherein 17R is provided for obtaining only a P wave from light, while 17L is for obtaining only an S wave from light), a mirror 18, a half mirror 19, a zoom lens 201, a polarizing beam splitter 20 for splitting light directed from zoom lens 201 into two directions (the P wave and the S wave), and two-dimensional image sensors 3R and 3L on which images are formed by light directed from polarizing beam splitter 20.

A main part of optics 13 comprises the light receiving optical system, a focusing mechanism 10 for controlling zoom lens 201, and a zooming mechanism 11.

An operation/control portion includes amplifiers 5R and 5L for amplifying outputs from image sensors 3R and 3L, A/D converters 6R and 6L, memories 7R and 7L, a computing unit 8, a system control 9, a speed detector 14, a moving direction detector 15, a swiveling mechanism 12, and a display 16.

Light (the P wave) passed through polarizer 17R transmits through half mirror 19 and polarizing beam splitter 20 through zoom lens 201 so as to be transmitted to image sensor 3R. Also, light (the S wave) passed through polarizer 17L is reflected from mirror 18 and half mirror 19, and then reflected from polarizing beam splitter 20 through zoom lens 201 so as to be transmitted to image sensor 3L.

The moving speed of the apparatus itself detected by speed detector 14 is conveyed to system control 9, so that depending on the conveyed speed, zoom lens 201 is driven by focusing mechanism 10 and zooming mechanism 11.

As in the first embodiment, in the case of the low moving speed of the apparatus itself, zoom lens 201 is driven to the wide side to shorten the focal length, thus securing a wide field of view to be measured.

On the contrary, in the case of the high moving speed of the apparatus itself, zoom lens 201 is driven to the tele side so as to increase the focal length, thus improving the measurement accuracy.

In such a structure, by orthogonal polarizing the P wave and the S wave which are spaced apart by a prescribed distance from each other can be combined in the same light path, and then those waves can be split again. Also, the number of zoom lenses required is reduced to one instead of two in the first embodiment, so as to reduce the number of working portions, thereby facilitating manufacture of the apparatus. Further, mutual adjustment of zoom lenses required in the first embodiment is not necessary.

In the meanwhile, the similar structure as in the first embodiment allows the moving direction of the apparatus itself detected by moving direction detector 15 to be conveyed to system control 9, so that depending on the conveyed direction, the direction of main part of optics 13 is varied to the moving direction of the apparatus Itself by means of swiveling mechanism 12, thereby achieving the proper measuring direction of the field of view.

Figure 3:
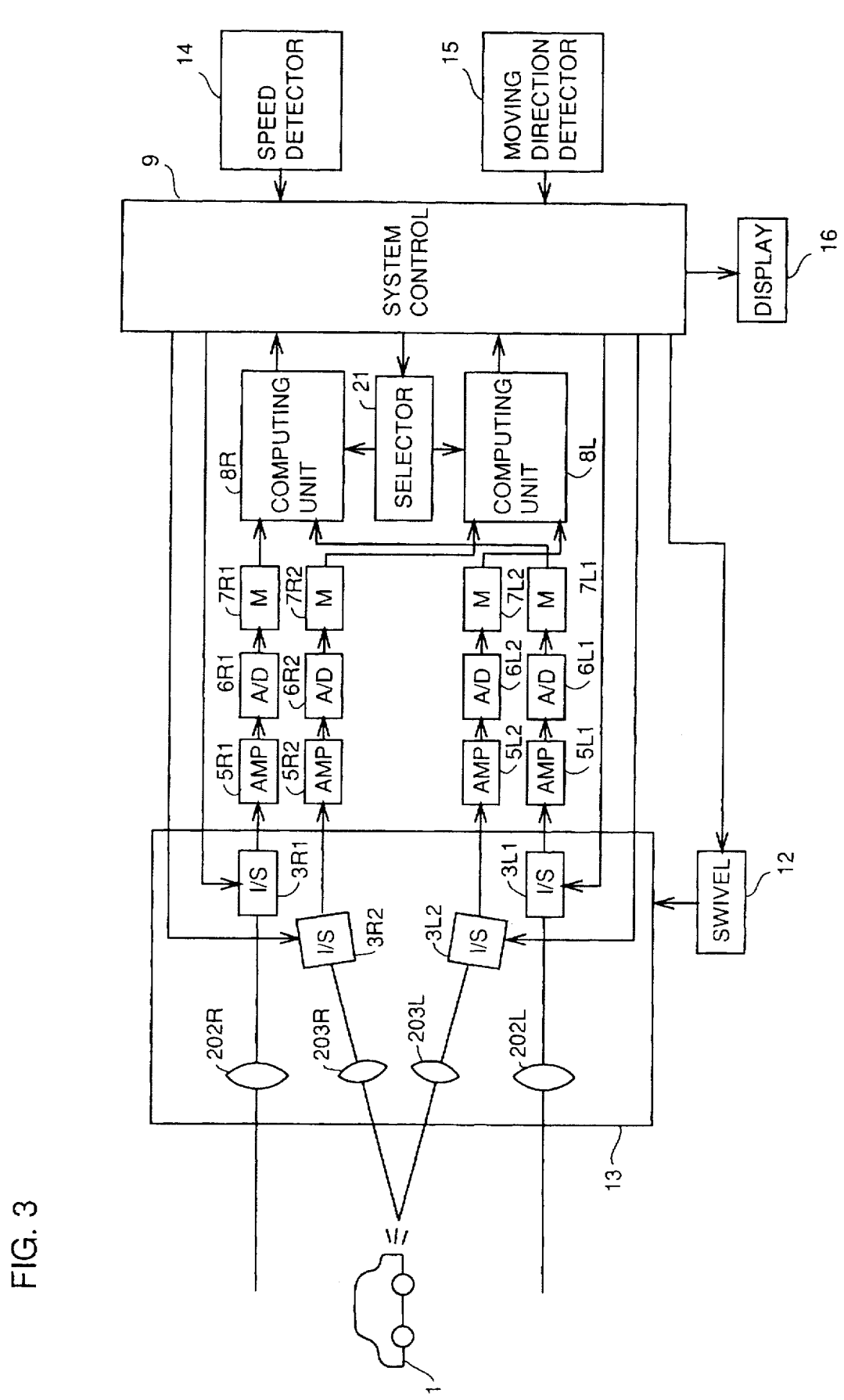
FIG. 3 is a structural view showing a distance measuring apparatus showing a third embodiment of the present invention.

FIG. 3 is a structural view of a passive type distance measuring apparatus according to a third embodiment of the present invention. A light receiving optical system in this embodiment includes: a pair of left and right long focal length lenses 202R and 202L capable of focusing at a long range and having a long focal length; two-dimensional image sensors 3R1 and 3L1 on which images are formed by light directed from these lenses 202R and 202L; a pair of left and right short focal length lenses 203R and 203L capable of focusing at a short range and having a short focal length, these lenses being provided inside long focal length lenses 202R and 202L so that the base length thereof is shorter than that of the long focal length lenses, these lenses 203R and 203L being also provided obliquely so as to bring a position where light axes cross with each other close to the object to be measured; and two-dimensional image sensors 3R2 and 3L2 on which images are formed by light directed from these short focal length lenses 203R and 203L.

A main part of optics 13 comprises the light receiving optical system. An operation/control portion includes: amplifiers 5R1, 5L1, 5R2, and 5L2 for amplifying outputs from image sensors 3R1, 3L1, 3R2 and 3L2, respectively; A/D converters 6R1, 6L1, 6R2, and 6L2; memories 7R1, 7L1, 7R2 and 7L2; computing units 8R and 8L; an operating portion selector 21; a system control 9; a speed detector 14; a moving direction detector 15; a swiveling mechanism 12; and a display 16.

In other words, there are two sets of lens-through-computing unit portions, one portion being for the long focal length and the other for the short focal length. Therefore, when the moving speed of the apparatus itself detected by speed detector 14 is conveyed to system control 9, if that moving speed of the apparatus itself is higher than a certain speed, the portion for the long focal length is selected by operating portion selector 21. On the other hand, if the moving speed of the apparatus itself is lower than a certain speed, the portion for the short focal length is selected at operating portion selector 21.

An appropriate speed for switching from the long focal length portion to the short focal length portion is about 60 km/h, by taking a relationship between the field of view to be measured and a breaking distance of the automobile or the like into consideration.

Since the long range portion (the long focal length portion) has a longer base line than the close range portion (the short focal length portion) so that the position where light axes cross with each other is closer to the object to be measured, the high measurement accuracy can be obtained in the case of the high moving speed of the apparatus itself, and the wide field of view to be measured can be obtained in the case of the low speed.

Examples of specific figures of the base length, the measurement accuracy, and the field of view to be measured related to the moving speed of, the apparatus itself are shown in Table 2 below (please note that methods for calculating the field of view to be measured and the measurement accuracy are the same as those in the first embodiment).

TABLE 2

| Moving speed of apparatus itself | 100 km/h | | 40 km/h | | |
|---|---|---|---|---|---|
| Base length | 100 mm (long range) | | 50 mm (close range) | | |
| Distance to object to be measured | 100 m | 60 m | 60 m | 15 m | 3 m |
| Maximum measurement error | ±1.7 m | ±0.6 m | ±1.2 m | ±7.5 cm | ±2.9 mm |
| Horizontal field of view to be measured at a position of object to be measured | 10.6 m | 6.3 m | 6.3 m | 1.5 m | 0.26 m |
| Minimum measurement distance | 1.0 m | | 0.5 m | | |
| Focal length | 60 mm | | | | |
| Width of image sensor | 6.4 mm (½ inch CCD) | | | | |
| Data detection limit of image sensor | ±1 μm | | | | |
| | (pixel pitch of 10 μm, positional detection accuracy is ± 1/10 of pixel pitch) | | | | |

The similar structure as in the first embodiment allows the moving direction of the apparatus itself detected by moving direction detector 15 to be conveyed to system control 9, so that depending on the conveyed direction, the direction of main part of optics 13 can be varied to the moving direction of the apparatus itself by swiveling mechanism 12, thereby achieving the proper measuring direction of the field of view.

Figure 4:
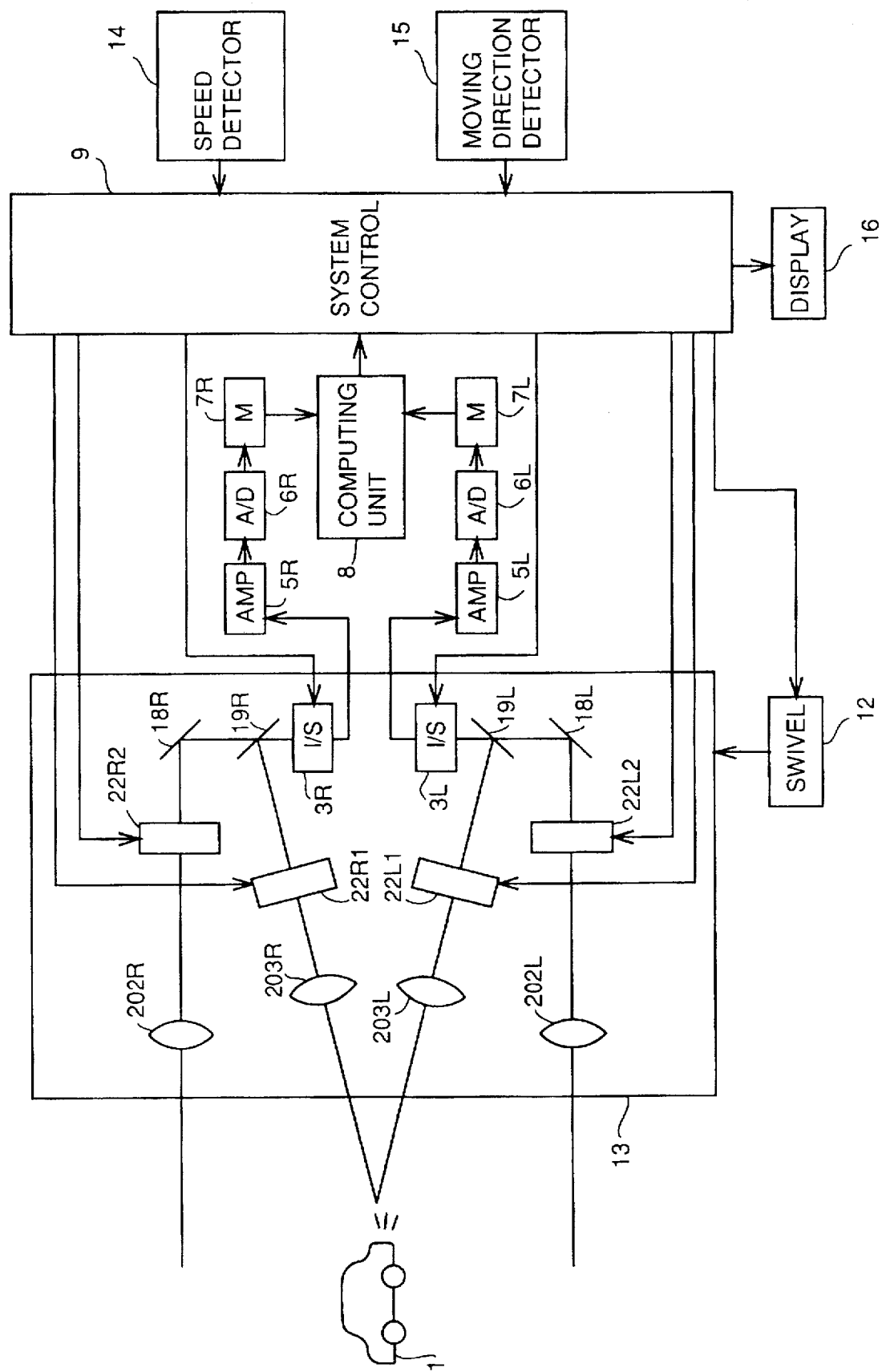
FIG. 4 is a structural view of a distance measuring apparatus showing a fourth embodiment of the present invention.

FIG. 4 is a structural view of a passive type distance measuring apparatus according to a fourth embodiment of the present invention. The distance measuring apparatus of the fourth embodiment is obtained by modifying the distance measuring apparatus of the third embodiment, wherein a part of light paths of the long range and close range lenses are shared, and the number of image sensors is reduced.

A light receiving optical system of this embodiment includes: a pair of left and right long focal length lenses 202R and 202L capable of focusing at a long range and having a long focal length; electro-optical shutters (which are implemented, for example, by widely-used liquid crystal shutters) 22R2 and 22L2 provided on light paths from these long focal length lenses 202R and 202L and capable of intercepting light directed from these lenses; a pair of left and right short focal length lenses 203R and 203L capable of focusing at a short range and having a short focal length, these lenses being provided inside long focal length lenses 202R and 202L so that the base length thereof is shorter than that of these long focal length lenses, these lenses 203R and 203L also being provided obliquely so as to bring the position where light axes cross with each other close to the object to be measured; electro-optical shutters 22R1 and 22L1 provided on light paths from these short focal length lenses 203R and 203L and capable of intercepting light directed from these lenses; mirrors 18R and 18L; half mirrors 19R and 19L; and two-dimensional image sensors 3R and 3L on which images are formed by light directed from these mirrors.

A main part of optics 13 comprises the light receiving optical system. An operation/control portion includes amplifiers 5R and 5L for amplifying outputs from image sensors 3R and 3L, A/D converters 6R and 6L, memories 7R and 7L, a computing unit 8, a system control 9, a speed detector 14, a moving direction detector 15, a swiveling mechanism 12, and a display 16.

When the moving speed of the apparatus itself detected by speed detector 14 is conveyed to system control 91, if the moving speed of the apparatus itself is higher than a prescribed speed, electro-optical shutters 22R2 and 22L2 provided on the light paths from long focal length lenses 202R and 202L are opened (please note that at this time electro-optical shutters 22R1 and 22L1 provided on the light paths from short focal lengths lenses 203R and 203L are closed), whereby light directed only from long focal length lenses 202R and 202L are reflected from mirrors 18R and 18L to transmit through half mirrors 19R and 19L to be conveyed to image sensors 3R and 3L.

On the contrary, if the moving speed of the apparatus itself is lower than a prescribed speed, then electro-optical shutters 22R1 and 22L1 provided on the light paths from short focal length lenses 203R and 203L are opened (please note that at this time electro-optical shutters 22R2 and 22L2 provided on the right paths from long focal lengths lenses 202R and 202L are closed), whereby light directed only from short focal length lenses 203R and 203L are reflected from half mirrors 19R and 19L to be conveyed to image sensors 3R and 3L.

An appropriate speed for switching from the long focal length portion to the short focal length portion is about 60 km/h as in the third embodiment.

As in the third embodiment, the base length is longer in the long range portion (the long local length portion) than in the close range portion (the short focal length portion), and the position where light axes cross with each other is brought close to the object to be measured. Therefore, the high measurement accuracy can be obtained in the case of the high moving speed of the apparatus itself, while the wide field of view to be measured can be obtained in the case of the low speed.

By such a structure, a part of the light paths of the long range and close range lenses can be shared, and the number of image sensors required can be reduced compared to the apparatus of the third embodiment.

Also, the similar structure as in the first embodiment allows the moving direction of the apparatus itself detected by moving direction detector 15 to be conveyed to system control 9, so that depending on the conveyed direction, the direction of main part of optics 13 can be varied to the moving direction of the apparatuses itself by swiveling mechanism 12, thereby achieving the proper measuring direction of the field of view.

Figure 5:
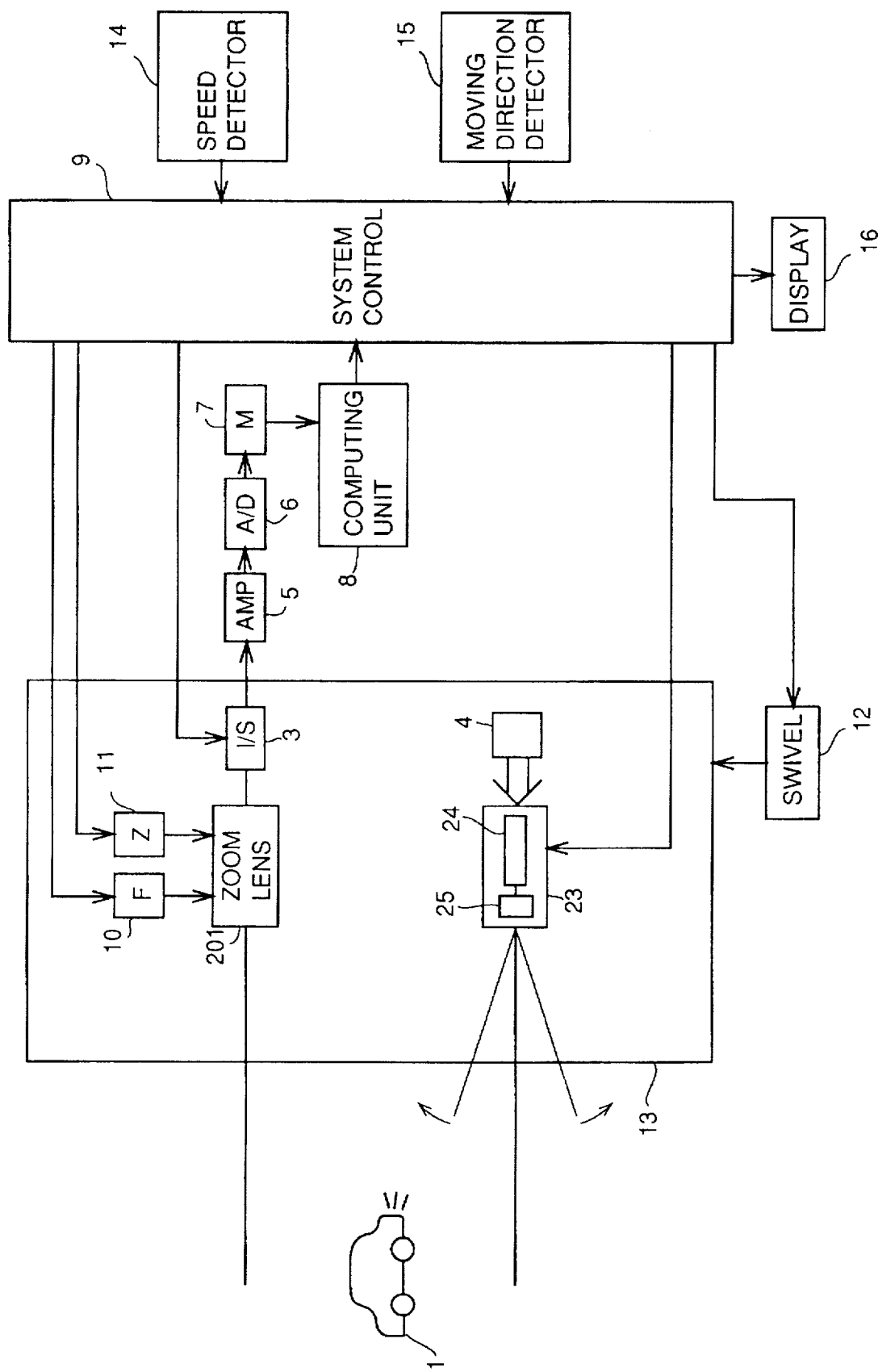
FIG. 5 is a structural view showing a distance measuring apparatus showing a fifth embodiment of the present invention.

FIG. 5 is a structural view of an active type distance measuring apparatus according to a fifth embodiment of the present invention.

A light receiving optical system of this embodiment comprises a zoom lens 201 and a two-dimensional image sensor 3 on which an image is formed by light directed from zoom lens 201. A light projecting optical system comprises a light source 4 and a scanning mechanism 23 (which will be described later in detail).

A main part of optics 13 includes the light receiving optical system, the light projecting optical system, and a focusing mechanism 10 and a zooming mechanism 11 for controlling zoom lens 201.

An operation/control portion includes an amplifier 5 for amplifying an output from image sensor 3, an A/D converter 6, a memory 7, a computing unit 8, a system control 9, a speed detector 14, a moving direction detector 15, a swiveling mechanism 12 and a display 16.

Scanning mechanism 23 includes an optical element 25 (for example, a cylindrical lens) for transforming the light emitted from light source 4 into a slit light 4, and a scanning portion 24 (for example, a polygon mirror or swiveling lens) for scanning this slit light.

The slit light is directed to object to be measured 1 by the scanning portion. An image of object to be measured 1 by the slit light reflected from object to be measured 1 is formed on image sensor 3 by means of light receiving optical system 2.

The moving speed of the apparatus itself detected by speed detector 14 is conveyed to system control 9, so that depending on the conveyed speed, zoom lens 201 is driven by focusing mechanism 10 and zooming mechanism 11.

As in the first embodiment, if the moving speed of the apparatus itself detected by speed detector 14 is low, zoom lens 201 is driven to the wide side so as to shorten the focal length, thereby widening the field of view to be measured.

On the contrary, in the case of the high speed, zoom lens 201 is driven to the tele side so as to increase the focal length, thereby improving the measurement accuracy.

In such a structure, although the scanning mechanism is required, it is not necessary to drive two zoom lenses concurrently as in the first embodiment.

Also, the similar structure as in the first embodiment allows the moving direction of the apparatus itself detected by moving direction detector 15 to be conveyed to system control 9, so that depending on the conveyed direction, the direction of main part of optics 13 can be varied to the moving direction of the apparatus itself by swiveling mechanism 12, thereby achieving the proper direction of the field of view to be measured.

Further, the similar structure as in the third and fourth embodiments of the passive type distance measuring apparatus may be applied to the active type distance measuring apparatus of the fifth embodiment, so as to vary the base length and the position where the light axes of the light projecting and light receiving optical systems cross, thereby determining whether the measurement accuracy or the field of view to be measured has priority.

In the meanwhile, in the fifth embodiment, it is possible to secure the wide field of view to be measured by increasing the scanning width of scanning mechanism 23. Conversely, decreasing the scanning width of scanning mechanism 23 enables to improve the measurement accuracy, although narrowing the field of view to be measured. In other words, the priority between the accuracy and the field of view during measurement can be varied successively by changing the scanning range of the slit light.

Now, an application of the distance measuring apparatus described above to a moving robot will be considered.

In this application, the principles of distance measurement are the same as those in the above-described apparatus for measuring the distance between two automobiles moving in the same direction; however, since the moving speed of the robot is slower than that of the automobile, the base length, the position of the focus lens, the focal length and the like of the distance measuring apparatus according to the respective embodiments have to be adjusted so as to correspond to the range of moving speed of the robot. In this respect, specific figures will be illustrated below.

As for the distance measuring apparatus of the first, second and fifth embodiments, the following Table 3 can be obtained.

TABLE 3

| Moving speed of apparatus itself | 60 m/min | | 0 (stop) | |
|---|---|---|---|---|
| Focal length | 10 mm | | 5 mm | |
| Distance to object to be measured | 5 m | 3 m | 3 m | 1 m |
| Maximum measurement error | ±25 mm | ±9.0 mm | ±18 mm | ±2.0 mm |
| Horizontal field of view to be measured at a position of object to be measured | 3.0 m | 1.8 m | 3.7 m | 1.2 m |
| Minimum measurement distance | 166 mm | | 83 mm | |
| Base length | 100 mm | | | |
| Width of image sensor | 6.4 mm(½ inch CCD) | | | |
| Data detection limit of image sensor | ±1 µm (pixel pitch of 10 µm, positional detection accuracy is ± 1/10 of pixel pitch) | | | |

In the meanwhile, the distance measuring apparatus according to the third and fourth embodiments, the following Table 4 can be obtained.

TABLE 4

| Moving speed of apparatus itself | 60 m/min | | 0 (stop) | |
|---|---|---|---|---|
| Base length | 10 mm (long range) | | 5 mm (close range) | |
| Distance to object to be measured | 5 m | 3 m | 3 m | 1 m |
| Maximum measurement error | ±25 mm | ±9.0 mm | ±18 mm | ±2.0 mm |
| Horizontal field of view to be measured at a position of object to be measured | 3.0 m | 1.8 m | 1.9 m | 58 cm |
| Minimum measurement distance | 166 mm | | 88 mm | |
| Focal length | 10 mm | | | |
| Width of image sensor | 6.4 mm (½ inch CCD) | | | |
| Data detection limit of image sensor | ±1 µm (pixel pitch of 10 µm, positional detection accuracy is ± 1/10 of pixel pitch) | | | |

Switching is carried out to the short range portion when the robot stops, while the long range portion is selected once the robot starts to move.

It is possible to control the moving speed and moving direction of the moving object by feeding back a distance information signal applied from the distance measuring apparatus of respective embodiments to the driving source of the moving object.

Figure 9:
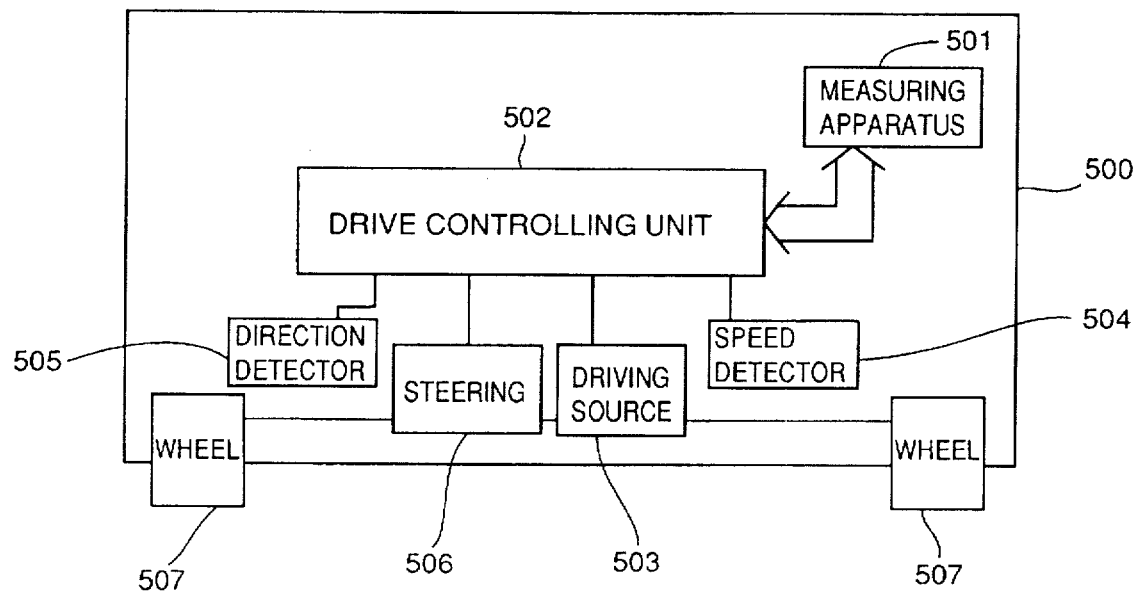
FIG. 9 is block diagram of a moving object having a distance measuring apparatus.

Such an operation will be described by use of FIG. 9. With reference to FIG. 9, a main body of a moving object 500 includes a distance measuring apparatus 501 described above, a drive controlling circuit 502, a driving wheel 507 for driving the moving object, a driving source 503 for driving the driving wheel, a speed detector 504 for detecting the speed of the moving object, a traveling direction detector 505 for detecting the traveling direction of the moving object, and a steering machine 506 for changing the traveling direction of the moving object.

Drive controlling circuit 502 outputs signals representative of the speed and the traveling direction of the moving object detected by speed detector 504 and traveling direction detector 505 to distance measuring apparatus 501. In response to these signals, distance measuring apparatus 501 varies the measurement accuracy and the field of view to be measured as described above.

Distance measuring apparatus 501 outputs distance information about a distance to the object to be measured to drive controlling circuit 502. Upon receipt of this distance information, drive controlling circuit 502 controls driving source 503 and steering machine 502 for changing the speed and the traveling direction of the moving object to correspond to the distance of the object to be measured.

Thus, transmission/reception of signals (data) between drive controlling circuit 502 and distance measuring apparatus 501 allows an accurate distance measurement depending on the moving status of the moving object, as well as controls the moving speed and the moving direction of the moving object based on the measurement result of distance measuring apparatus 501.

As a specific example, an automobile having the apparatus for measuring the distance between two automobiles moving in the same direction will be considered below as the moving object provided with the distance measuring apparatus.

When the automobile is running on a busy street or a road having poor visibility, or when the automobile approaches a curve or a crossing, a driver drives the automobile carefully at a low speed. At such a time, there must be a small risk for the automobile to collide with an object existing at a far distance. In this case, a wide range detection of an object rushing out from the side or an object existing at a close distance rather than at a far distance is allowed.

Conversely, when the automobile is running at a high speed on, for example, a free way, there is a risk for the automobile to collide with an object existing at a far distance. In such a case, an object existing even at a far distance can be detected by improving the measurement accuracy.

When the distance measuring apparatus is mounted to a self-controlled moving robot, operations will be as follows. More specifically, when there are many obstacles around the robot or the robot is intended to change its moving direction, the robot moves at a low speed. Also, in the absence of work, the robot stops to supervise an area around itself. In such a case, the distance measuring apparatus can detect objects existing at a close distance for a wide range.

Conversely, when there are no obstacles around the robot and the robot moves in one direction, the robot moves toward an aiming position at a high speed. In this case, the moving speed of the robot can be controlled by measuring a distance to an obstacle located at a far distance such that the moving speed is decreased as the robot approaches the obstacle or the aiming position in order for preventing the robot from colliding with the obstacle. In other words, the measurement accuracy can be improved during the high speed movement of the robot.

Thus, in the distance measuring apparatus mounted in the moving object, the field of view to be measured can be secured in the case of the low speed movement of the moving object, while the measurement accuracy can be secured in the case of the high speed movement of the moving object.

As described above, the present invention allows such a measurement in which the optimal accuracy and field of view are always secured under various conditions that a moving object is to encounter by varying the factors below depending on a moving speed and a moving direction of the moving object: a focal length of a light receiving optical system; a scanning range of a light projecting optical system; a base length; a position where light axes of a pair of light receiving optical systems or light axes of light receiving and light projecting optical systems cross with each other; and a measurement direction of a field view to be measured.

Therefore, when the moving object provided with such a distance measuring apparatus is running at a low speed, an object existing at a close distance rather than at a far distance or an object rushing out from the side can be widely detected.

On the other hand, if the moving object is running at a high speed, it is possible to detect an object existing even at a far distance.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A distance measuring apparatus mounted on a moving object, comprising:
    a speed detector which detects a moving speed of said object; and
    a controller which varies an area to be measured and measurement accuracy of said distance measuring apparatus depending on the moving speed of said moving object detected by said speed detector.

2. The distance measuring apparatus according to claim 1, wherein
    control of said controller is such that the measurement accuracy of said distance measuring apparatus is increased as said moving object moves faster, and on the other hand, the area to be measured of said distance measuring apparatus is widened as said moving object moves slower.

3. The distance measuring apparatus according to claim 1, further comprising:
    a pair of light receiving optical systems spaced apart from each other by a prescribed base length which obtains images of an object to be measured, each light receiving optical system having a variable focal length;
    a pair of image sensors which sense images formed by said light receiving optical systems; and
    a computing unit which calculates a distance to said object to be measured in response to a pair of signals output from said image sensors, wherein
    said controller changes the focal length of said light receiving optical systems depending on the moving speed of the moving object.

4. The distance measuring apparatus according to claim 3, wherein
    said light receiving optical systems are zoom lenses.

5. The distance measuring apparatus according to claim 1, further comprising:
    two pairs of light receiving optical systems, each pair of light receiving optical systems being spaced apart from each other by a base length, which obtain images of an object to be measured, a different base length being used for each pair;
    a pair of image sensors which sense images formed by said light receiving optical systems; and
    a computing unit which calculates a distance to said object to be measured in response to a pair of signals output from said image sensors, wherein
    said controller selects one of the light receiving system to be used depending on the moving speed of the moving object.

6. The distance measuring apparatus according to claim 1, further comprising:
    a pair of light receiving optical systems, spaced apart from each other by a variable base length, which obtains images of an object to be measured;
    a pair of image sensors which sense images formed by said light receiving optical systems; and
    a computing unit which calculates a distance to said object to be measured in response to a pair of signals output from said image sensors, wherein
    said controller changes the base length of said light receiving optical systems depending on the moving speed of the moving object.

7. The distance measuring apparatus according to claim 1, further comprising:
    a pair of light receiving optical systems which obtains images of an object to be measured;
    a pair of image sensors which sense images formed by said light receiving optical systems; and
    a computing unit which calculates a distance to said object to be measured in response to a pair of signals output from said image sensors, wherein
    said controller changes a position where optical axes of said two light receiving optical systems cross with each other depending on the moving speed of the moving object.

8. The distance measuring apparatus according to claim 1, further comprising:
    two pairs of light receiving optical systems, each pair having a different position where light axes cross with each other, which obtain images of an object to be measured;
    a pair of image sensors which sense images formed by said light receiving optical systems; and
    a computing unit which calculates a distance to said object to be measured in response to a pair of signals output from said image sensors, wherein
    said controller selects one of said light receiving optical systems to be used depending on the moving speed of the moving object.

9. The distance measuring apparatus according to claim 1, further comprising:
    a first polarizer which draws a first polarized component from light passing through itself;
    a second polarizer which draws a second polarized component, which is orthogonal with respect to the first polarized component, from light passing through itself;
    means for combining the components from said two polarizers into the same light path;
    a light receiving optical system having a variable focal length which forms the components from said two polarizers to obtain an image of an object to be measured;

a third polarizer which re-splits said to components combined in the same light path into two orthogonally polarized components;

a pair of image sensors which senses images of said two orthogonally polarized components; and a computing unit which calculates a distance to said object to be measured in response to a pair of signals output from said image sensors, wherein said controller changes the focal length of said light receiving optical systems depending on the moving speed of the moving object.

10. The distance measuring apparatus according to claim 9, wherein said light receiving optical system is a zoom lens.

11. The distance measuring apparatus according to claim 1, further comprising:

a light projecting optical system which directs light to an object to be measured;

a light receiving optical system having a variable focal length which obtains an image of the light reflected from said object to be measured;

an image sensor which senses the image formed by said light receiving optical system; and a computing unit which calculates a distance to said object to be measured in response to a signal output from said image sensor, wherein said controller changes the focal length of said light receiving optical system depending on the moving speed of the moving object.

12. The distance measuring apparatus according to claim 11, wherein said light receiving optical system is a zoom lens.

13. The distance measuring apparatus according to claim 1, further comprising:

a light projecting optical system which directs light to an object to be measured;

a light receiving optical system spaced apart from the light projecting optical system by a variable base length which obtains an image of the light reflected from said object to be measured;

an image sensor which senses the image formed by said light receiving optical system; and a computing unit which calculates a distance to said object to be measured in response to a signal output from said image sensor, wherein said controller changes the base length depending on the moving speed of the moving object.

14. The distance measuring apparatus according to claim 1, further comprising:

a light projecting optical system which directs light to an object to be measured;

a light receiving optical system which obtains an image of the light reflected from said object to be measured;

an image sensor which senses the image formed by said light receiving optical system; and a computing unit which calculates a distance to said object to be measured in response to a signal output from said image sensor, wherein said controller changes a position where the light axes of said light projecting optical system and said light receiving optical system cross with each other depending on the moving speed of the moving object.

15. The distance measuring apparatus according to claim 1, further comprising:

a light emitting element;

a scanning means which scans light emitted from said light emitting element on an object to be measured;

a light receiving optical system which obtains an image of the light reflected from said object to be measured;

an image sensor which senses the image formed by said light receiving optical system; and a computing unit which calculates a distance to said object to be measured in response to a signal output from said image sensor, wherein said controller changes a scanning range of the scanning means depending on the moving speed of the moving object.

16. The distance measuring apparatus according to claim 1, further comprising a moving direction detector which detects a moving direction of said moving object, wherein said controller varies a measurement direction of said distance measuring apparatus depending on the moving direction of said moving object.

17. The distance measuring apparatus according to claim 1, wherein said controller controls the measuring apparatus such that the measurement accuracy of said distance measuring apparatus is increased when said moving object moves, while the area to be measured by said distance measuring apparatus is widened when said moving object stops.

18. A distance measuring apparatus mounted on a moving object, comprising:

a speed detector which detects a moving speed of said moving object; and a controller which varies measurement accuracy of said distance measuring apparatus depending on the moving speed of said moving object detected by said speed detector.

19. The distance measuring apparatus according to claim 18, wherein the controller increases measurement accuracy of said distance measuring apparatus as said moving object moves faster.

20. The distance measuring apparatus according to claim 18, wherein the controller sets the measurement accuracy of said distance measuring apparatus at a first accuracy when the moving object moves and sets the measurement accuracy of said distance measuring apparatus at a second accuracy when the moving object stops.

21. A distance measuring apparatus mounted on a moving object, comprising:

a speed detector which detects a moving speed of said moving object;

a light receiving optical system which defines an area to be measured, said area being varied by changing optical characteristics of the light receiving optical system;

a controller which varies the area to be measured depending on the moving speed of said moving object detected by said speed detector.

22. The distance measuring apparatus according to claim 21, wherein the controller widens the area as said moving object moves slower.

23. The distance measuring apparatus according to claim 21, wherein said optical system comprises a light receiving optical unit, and said area to be measured is varied by controlling the light receiving optical unit.

24. The distance measuring apparatus according to claim 23, wherein said area to be measured is varied by changing a focal length of the light receiving optical unit.

25. The distance measuring apparatus according to claim 23, wherein said area to be measured is varied by changing a direction of the light receiving optical unit.

26. The distance measuring apparatus according to claim 21, wherein the controller sets the area at a first area when the moving object moves and sets the area at a second area when the moving object stops.

27. A distance measuring apparatus mounted on a moving object, said distance measuring apparatus optically detecting a distance to an object, comprising:

a light receiving optical system which defines an area to be measured, said distance measuring apparatus measuring the distance to an object within said area;

a moving direction detector which detects a moving direction of said moving object; and a controller which varies the direction of the area of measurement defined by said light receiving optical system depending on the detection of said moving direction detector.

28. The distance measuring apparatus as claimed in claim 27, wherein said distance measuring apparatus detects the distance to the object by triangulation.

29. The distance measuring apparatus as claimed in claim 27, further comprising:

a unit including said light receiving optical system and a light receptor, said unit defining the direction of the area;

wherein said controller varies the direction of the area by changing the direction of said unit.

30. The distance measuring apparatus as claimed in claim 27, wherein said light receiving optical system has a least two pre-set view angles which can be alternatively selected to vary said direction.

31. A moving object, comprising:

a driving mechanism which moves said moving object;

a speed detector which detects a moving speed of said moving object;

a distance detector having a light receiving optical system which defines a detection area, said detection area being varied by changing optical characteristics of the light receiving optical system, and said distance detector detecting a distance to an object existing in the moving direction of said moving object; and a measurement controlling portion which controls said detection area depending on said detected speed.

32. The moving object according to claim 31, further comprising a drive controlling portion which controls said driving mechanism, wherein said drive controlling portion controls the speed of said moving object depending on the measured distance to the object.

33. The moving object according to claim 32, further comprising:

a steering mechanism which changes a traveling direction of said moving object;

a moving direction detector which detects a moving direction of said moving object; and a supporting mechanism which supports said distance detector and which varies a measuring direction of said distance detector, wherein said measurement controlling portion varies the measuring direction of said measuring portion by the supporting mechanism depending on the traveling direction of said moving object.

34. The moving object according to claim 31, wherein said distance detector detects a distance optically by triangulation.

35. The distance measuring apparatus according to claim 31, wherein the measurement controlling portion sets the detection area at a first area when the moving object moves and sets the detection area at a second area when the moving object stops.

36. A distance measuring apparatus comprising:

a light receiving optical system which has a variable focal length, said light receiving optical system defining an area to be measured, and said area being varied by changing the focal length;

an image detector which detects an image of an object in the area defined by the light receiving optical system and generates a signal; and a computing unit which calculates a distance between the object and the distance measuring apparatus based on the signal.

37. A distance measuring apparatus comprising:

a pair of light receiving optical systems spaced apart from each other by a variable base length, said light receiving optical systems defining an area to be measured, and said area being varied by changing the base length;

a pair of image sensors which sense images formed by said light receiving optical systems; and a computing unit which calculates a distance between the object and the distance measuring apparatus in response to a pair of output signals from said image sensors.

38. A distance measuring apparatus mounted on a moving object comprising:

a pair of light receiving optical systems which define an area to be measured, said area being varied by changing a position where optical axes of said light receiving optical systems cross with each other;

a pair of image sensors which sense images formed by said light receiving optical systems;

a detector which detects a condition of said moving object; and a controller which varies said area defined by said light receiving optical systems based on the condition detected by said detector and which calculates a distance between the object and the distance measuring apparatus in response to a pair of signals output from said image sensors.

39. The distance measuring apparatus as claimed in claim 38, wherein said detector detects the speed of the vehicle.

40. A distance measuring apparatus mounted on a moving object, comprising:

a speed detector which detects a moving speed of said object;

a light receiving optical system which obtains an image of an object to be measured;

an image sensor which senses the image formed by said light receiving optical system;

a computing unit which calculates a distance to said object to be measured in response to an output signal from said image sensor; and a controller which changes a condition of the light receiving optical system depending on the moving speed of said moving object detected by said speed detector.

41. A distance measuring apparatus mounted on a moving object comprising an area changing unit which changes an area over which distance is measured by said distance measuring apparatus and a direction changing unit which changes the direction of said distance measuring unit relative to said moving object.

42. The distance measuring apparatus as claimed in claim 41, further comprising a light receiving optical system which defines the area;

wherein said area changing unit changes the angle by changing view angle of said light receiving optical system.

* * * * *